(12) United States Patent
Schneider et al.

(10) Patent No.: US 11,983,497 B2
(45) Date of Patent: May 14, 2024

(54) IDENTIFICATION AND PERSONALIZED PROTECTION OF TEXT DATA USING SHAPLEY VALUES

(71) Applicants: Drexel University, Philadelphia, PA (US); Cornell University, Ithaca, NY (US)

(72) Inventors: Matthew John Schneider, Philadelphia, PA (US); Shawn Mankad, Ithaca, NY (US)

(73) Assignee: Drexel University, Philadelphia, PA (US)

( * ) Notice: Subject to any disclaimer, the term of this patent is extended or adjusted under 35 U.S.C. 154(b) by 620 days.

(21) Appl. No.: 16/953,516

(22) Filed: Nov. 20, 2020

(65) Prior Publication Data
US 2021/0165965 A1    Jun. 3, 2021

Related U.S. Application Data

(60) Provisional application No. 62/937,851, filed on Nov. 20, 2019.

(51) Int. Cl.
*G06F 40/00* (2020.01)
*G06F 40/295* (2020.01)
*G06N 7/01* (2023.01)
*G06V 30/414* (2022.01)
*G06V 30/416* (2022.01)

(52) U.S. Cl.
CPC ............. *G06F 40/295* (2020.01); *G06N 7/01* (2023.01); *G06V 30/414* (2022.01); *G06V 30/416* (2022.01)

(58) Field of Classification Search
CPC ........ G06F 40/253; G06F 40/20; G06F 40/10; G06F 40/00; G06F 40/258; G06F 40/263; G06F 40/268; G06F 40/274; G06F 40/295; G06F 40/35; G06F 40/44; G06F 40/103; G06F 40/284; G06F 40/232; G06F 40/205; G06F 40/216; G06F 40/226; G06N 20/10; G06N 20/00; G06N 20/20; G06N 3/02; G06N 3/092; G06N 3/094; G06N 3/096;
(Continued)

(56) References Cited

U.S. PATENT DOCUMENTS

| 8,214,357 B2* | 7/2012 | Scott ...................... G06Q 30/02 707/726 |
| 9,063,927 B2* | 6/2015 | Hall ........................ G06F 40/30 |

(Continued)

OTHER PUBLICATIONS

Zheng, Rong, et al. "A framework for authorship identification of online messages: Writing-style features and classification techniques." Journal of the American society for information science and technology 57.3 (2006): 378-393. (Year: 2006).*
(Continued)

*Primary Examiner* — Edgar X Guerra-Erazo
(74) *Attorney, Agent, or Firm* — Schott P.C.

(57) ABSTRACT

Privacy, protection, and de-anonymization are issues of societal importance that are implicitly at the core of several key information systems, from electronic health records to online reviews. The system and method herein allows for an identification of an author of anonymous writing based on the text and structured data, subject to practical constraints on the intruder's amount of training data and effort using Shapley values.

7 Claims, 17 Drawing Sheets

(58) Field of Classification Search
CPC ........ G06N 3/091; G06N 3/09; G06N 3/0895; G06N 3/088; G06N 3/08
See application file for complete search history.

(56) References Cited

U.S. PATENT DOCUMENTS

| | | | | |
|---|---|---|---|---|
| 9,292,493 | B2* | 3/2016 | Chandramouli | G06F 40/30 |
| 9,613,024 | B1* | 4/2017 | Zhang | G06F 40/284 |
| 10,198,426 | B2* | 2/2019 | Nakamura | G06F 40/205 |
| 11,061,951 | B2* | 7/2021 | Boni | G06N 7/01 |
| 2007/0150426 | A1* | 6/2007 | Asher | G06F 18/24137 |
| | | | | 709/224 |
| 2012/0254333 | A1* | 10/2012 | Chandramouli | G06F 40/10 |
| | | | | 709/206 |
| 2013/0138428 | A1* | 5/2013 | Chandramouli | H04L 63/1416 |
| | | | | 704/9 |
| 2015/0254566 | A1* | 9/2015 | Chandramouli | G06N 20/10 |
| | | | | 706/11 |
| 2017/0139897 | A1* | 5/2017 | Nakamura | G06F 40/253 |
| 2019/0065473 | A1* | 2/2019 | Chen | G06F 40/30 |
| 2020/0104887 | A1* | 4/2020 | Cummings | G06F 40/253 |

OTHER PUBLICATIONS

Orebaugh, Angela, and Dr Jeremy Allnutt. "Data mining instant messaging communications to perform author identification for cybercrime investigations." Digital Forensics and Cyber Crime: First International ICST Conference, ICDF2C 2009, Albany, NY, USA, Sep. 30-Oct. 2, 2009. (Year: 2009).*

* cited by examiner

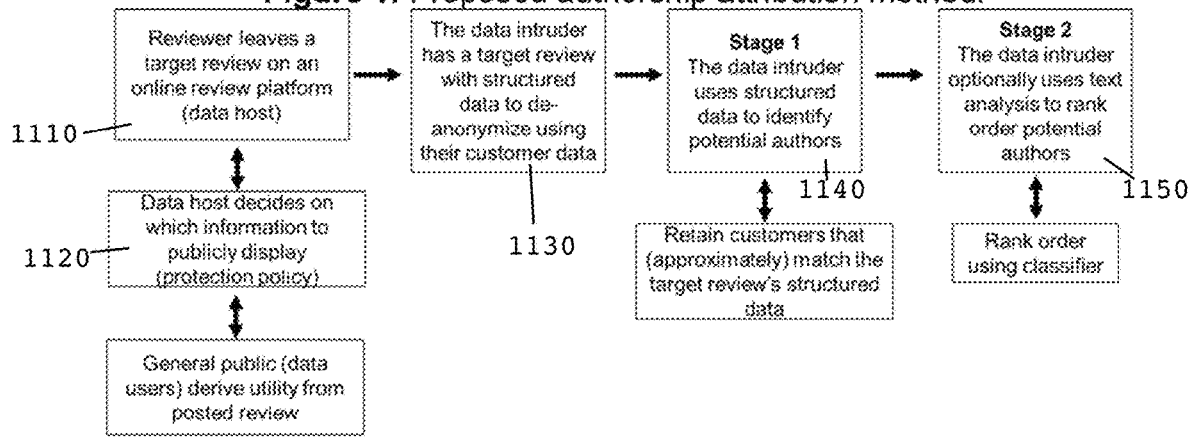

Figure 1: Proposed authorship attribution method.

FIG. 1.1

Table 1: Predictor variables calculated from the text of each document.

| Category | Technical Proficiency | Description | Count |
|---|---|---|---|
| Bag of words (Content) | Sophisticated | Frequency of any word that appears in the text | > 1000 (Depends on text corpus) |
| Punctuation | Simple | Frequency of ! . ? # @ $ % & , ; : ( ) | 14 |
| Stop words | Moderate | Frequency of words like "the", "of", "and" | 174 |
| Stylometry | Simple | Frequency of $a$ to $z$ (ignoring case) | 26 |
| | | Frequency of 0 to 9 | 10 |
| | | Number of words | 1 |
| | Moderate | Frequency of words with a mix of upper and lower case letters | 1 |
| | | Frequency of words that have 1-30 characters | 30 |
| | | Vocabulary richness (Yule's K) | 1 |
| | | Flesch-Kincaid reading level | 1 |

Table 2: Summary of investigated dataset.

FIG. 1.2

| Dataset | Number of potential authors | Structured data variables | Number of documents | Average word count |
|---|---|---|---|---|
| Yelp Online Reviews | 1,326,116 | First Name, Last Name, Product/Service | 5,261,687 | 114.10 |

FIG. 1.3

Table 3: First stage results for the Yelp dataset.

| Features for matching | Number of potential authors ($N_t$) | | | | | |
|---|---|---|---|---|---|---|
| | Avg. | 50% quantile | 75% quantile | 95% quantile | 99% quantile | Max |
| None (millions) | 1.32 MM | 1.32 MM | 1.32 MM | 1.32 MM | 1.32 MM | 1.32 MM |
| First Name | 13.94 | 1 | 2 | 16 | 179.01 | 12,120 |
| Last Name | 269.97 | 1 | 2 | 7 | 37.89 | 1.32 MM |
| First Name + Last Name | 12.46 | 1 | 2 | 14 | 150 | 11,976 |
| First Name + Last Name Initial | 12.81 | 1 | 2 | 14 | 158 | 11,976 |
| First Name Initial + Last Name Initial | 1719.98 | 10 | 27 | 123.5 | 69,822.9 | 165,687 |
| First Name + Business/Service Purchase | 1.15 | 1 | 1 | 2 | 4 | 65 |
| First Name Initial + Business/Service Purchase | 3.57 | 1 | 3 | 12 | 33 | 956 |
| First Name + Last Name + Business/Service Purchase | 1.15 | 1 | 1 | 2 | 4 | 65 |
| First Name Initial + Last Name Initial + Business/Service Purchase | 3.45 | 1 | 3 | 12 | 32 | 944 |

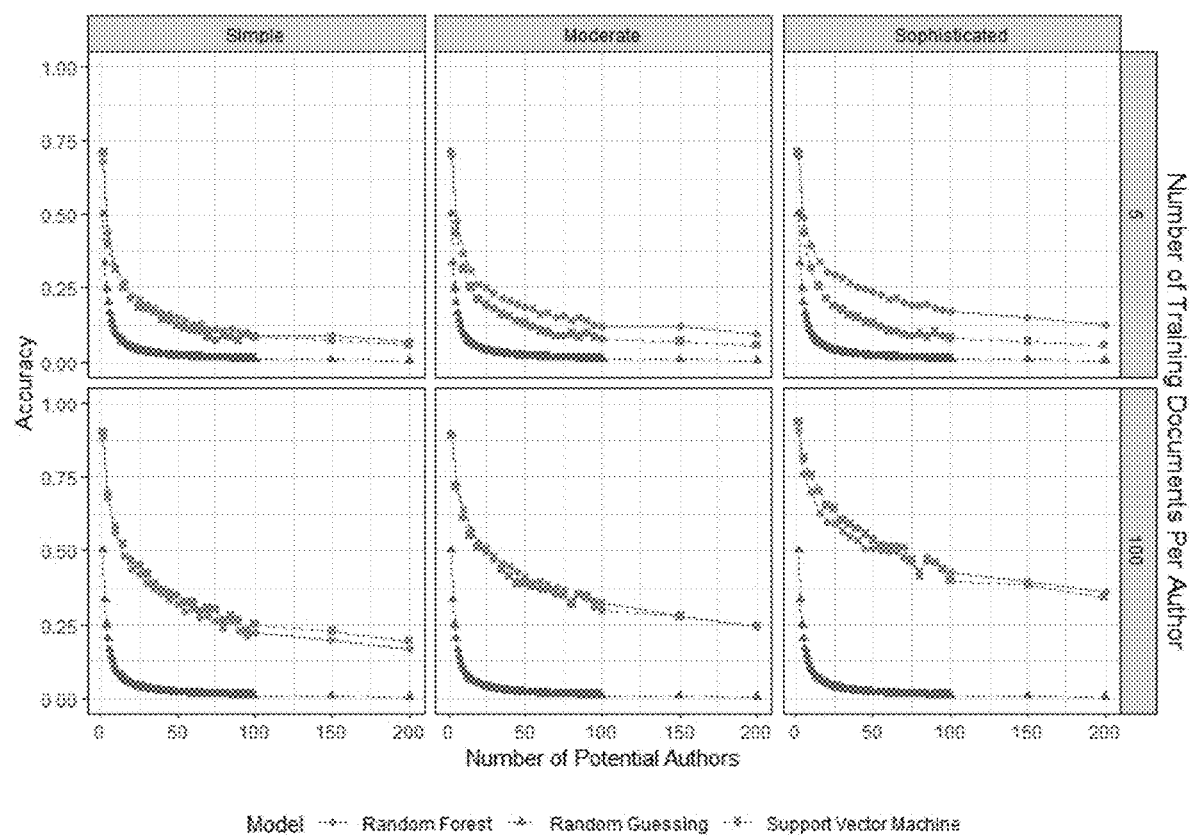
Figure 2: Second stage accuracy results for the Yelp dataset.

Figure 3: The number of candidate authors by amount of training data needed to attribute authorship with at least 50% accuracy.

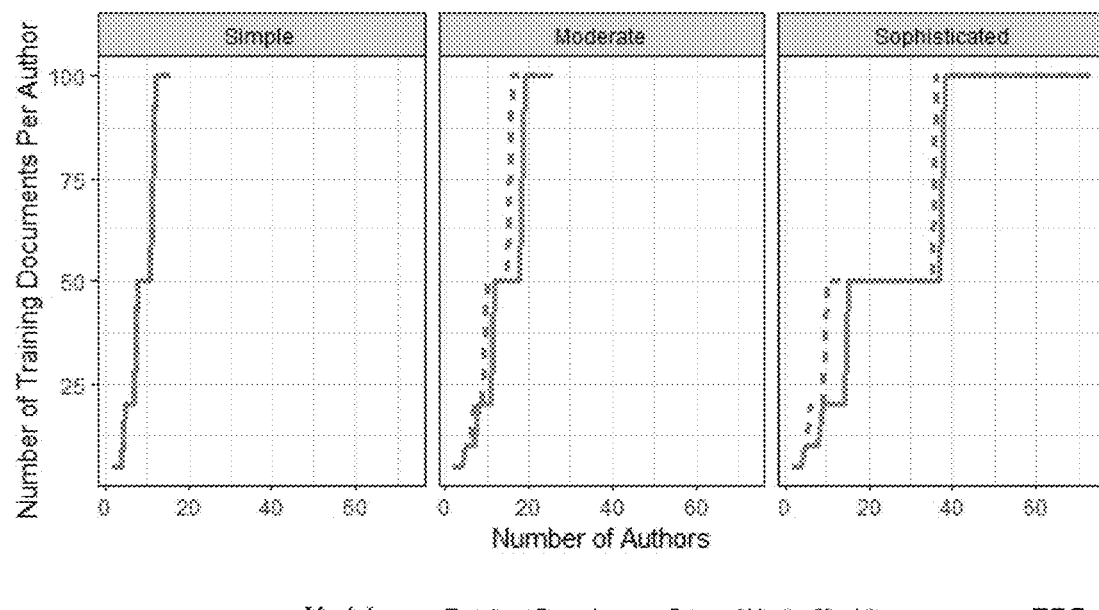

FIG. 3.1

Table 4: Proportion of reviews that reveal structured data in the text based on MTurk labeling of 1,035 reviews.

| Statistic | % of reviews |
|---|---|
| Age revealed | 0.2 |
| Transaction date revealed to within 7 days | 0.6 |
| Gender revealed | 8.2 |
| Race revealed | 0.2 |
| Home state or more precise location revealed | 11.1 |
| At least one of the above revealed | 16.1 |

FIG. 3.2

Table 5: Usefulness and probability of identification as a function of the count of structured data that is revealed in the text.

| Text Revelation | Average useful votes received | | Quantile | | | | |
|---|---|---|---|---|---|---|---|
| | | | 50% | 75% | 95% | 99% | 100% |
| | | | First and Second Stage Results | | | | |
| 0 | 0.84 | 1st Stage $N_t$ | 1.3 MM | 1.3 MM | 1.3 MM | 1.3 MM | 1.3 MM |
| | | 2nd Stage Accuracy | 0.00 | 0.00 | 0.00 | 0.00 | 0.00 |
| 1 | 1.01 | 1st Stage $N_t$ | 1 | 2 | 16 | 179.01 | 12,120 |
| | | 2nd Stage Accuracy | 1.00 | 0.94 | 0.68 | 0.36 | 0.00 |
| 2 | 1.21 | 1st Stage $N_t$ | 1 | 2 | 14 | 150 | 11,976 |
| | | 2nd Stage Accuracy | 1.00 | 0.94 | 0.69 | 0.39 | 0.00 |
| 3 | 4.00 | 1st Stage $N_t$ | 1 | 1 | 2 | 4 | 65 |
| | | 2nd Stage Accuracy | 1.00 | 1.00 | 0.94 | 0.86 | 0.51 |

Note: 1st and 2nd Stage results are based on Table 2, Figure 2, and a Sophisticated Platform with 100 training documents.

FIG. 3.3

Table 6: Summary statistics for predictors of review usefulness.

| Statistic | N | Mean | St. Dev. | Min | Max |
|---|---|---|---|---|---|
| Useful (DV) | 1,035 | 0.879 | 2.244 | 0 | 28 |
| Text Revelation | 1,035 | 0.203 | 0.441 | 0 | 3 |
| Word Count | 1,035 | 99.014 | 98.954 | 15 | 808 |
| Flesch-Kincaid | 1,035 | 5.881 | 5.055 | -1.438 | 85.392 |
| Review Rating | 1,035 | 3.756 | 1.576 | 1 | 5 |
| Polarity | 1,035 | 0.465 | 0.589 | -1.568 | 6.132 |
| Yule's $K$ | 1,035 | 103.299 | 54.320 | 0.000 | 625.000 |

FIG. 3.4

Table 7: Using generalized linear models to explain review usefulness on Yelp. Reviews that reveal more structured data tend to be more useful to the general public.

|  | Logistic | | Negative Binomial | | OLS | |
|---|---|---|---|---|---|---|
|  | DV = Useful > 0? | | DV = Useful | | DV = log(1+Useful) | |
| Text Revelation | 0.286*** | (0.101) | 0.201** | (0.089) | 0.070*** | (0.027) |
| Word Count | 0.006*** | (0.001) | 0.006*** | (0.001) | 0.002*** | (0.0003) |
| Polarity | -0.036 | (0.151) | -0.093 | (0.128) | -0.034 | (0.038) |
| Yule's K | 0.003** | (0.001) | 0.002** | (0.001) | 0.001* | (0.0003) |
| Flesch-Kincaid | -0.019 | (0.016) | -0.003 | (0.011) | -0.005 | (0.004) |
| Review Rating | -0.119** | (0.056) | -0.108** | (0.049) | -0.032** | (0.015) |
| Text Revelation * Word Count | -0.001*** | (0.0005) | -0.001** | (0.0004) | -0.0004*** | (0.0001) |
| Constant | -0.974*** | (0.268) | -0.723*** | (0.236) | 0.253*** | (0.070) |
| Observations | 1,035 | | 1,035 | | 1,035 | |
| $R^2$ | | | | | 0.115 | |
| Adjusted $R^2$ | | | | | 0.109 | |
| Log Likelihood | -633.362 | | -1,207.748 | | | |
| Theta | | | 0.436*** | (0.041) | | |
| Akaike Inf. Crit. | 1,282.724 | | 2,431.497 | | | |
| Residual Std. Error (df = 1027) | | | | | 0.562 | |
| F Statistic (df = 7; 1027) | | | | | 14.922*** | |

Note: *p<0.1; p<0.05; *p<0.01

FIG. 4    Full second stage accuracy results for the Yelp dataset.

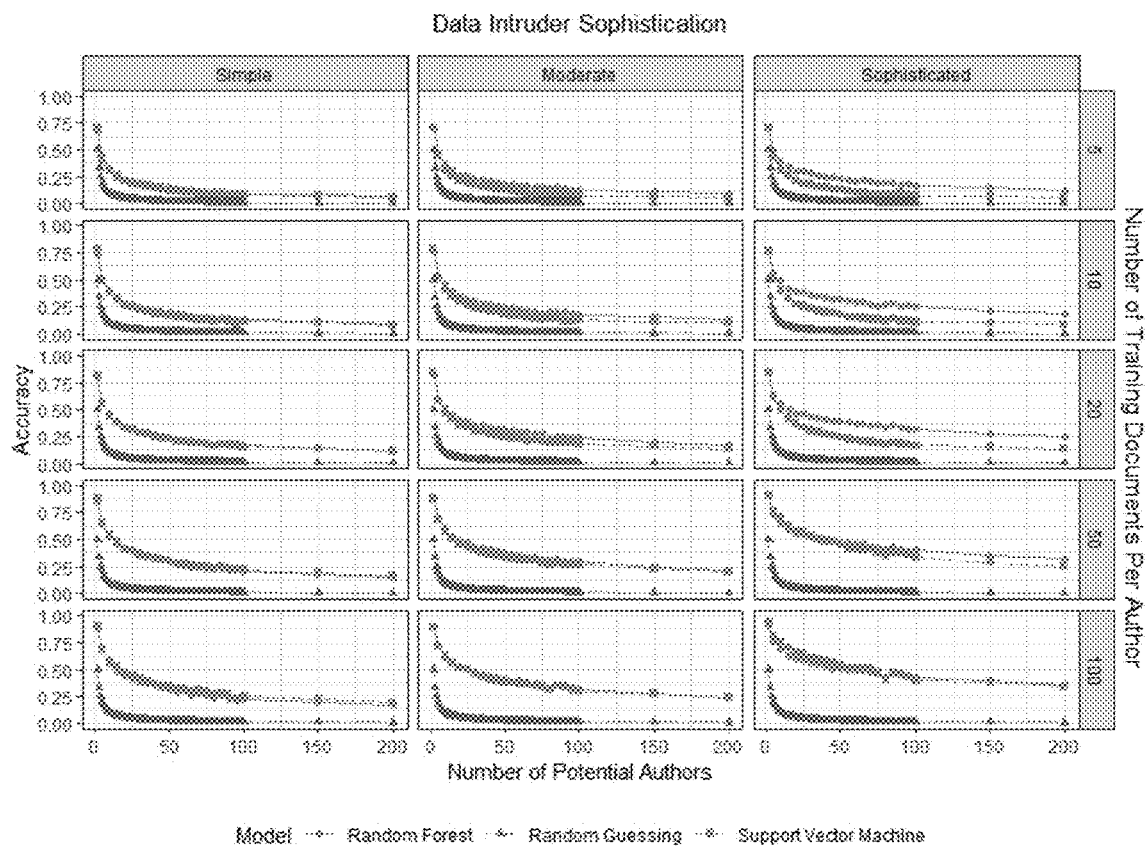

FIG. 5.1

Table B1. Summary of investigated datasets.

| Dataset | Document Type | Number of Potential Authors | Number of Documents | Average Word Count |
|---|---|---|---|---|
| Brennan-Greenstadt (Brennan et. al 2012) | Essays | 12 | 113 | 508.92 |
| Extended Brennan-Greenstadt (Brennan et. al 2012) | Essays | 45 | 699 | 497.62 |
| U.S. Senator Tweets (Xia et. al 2016) | Tweets | 100 | 198,265 | 17.55 |
| Enron Emails www.muix.com/enron | Redacted Emails | 106 | 107,623 | 192.70 |

FIG. 5.1.1

Table B1.1 Out of sample accuracy for a "simple" data intruder, averaged over varying number of potential authors.

| # Training Documents | Model | Brennan-Greenstadt Corpus | Extended Brennan-Greenstadt Corpus | Twitter | Enron |
|---|---|---|---|---|---|
| 5 | Classification Tree | 0.373 | 0.244 | 0.177 | 0.254 |
| 5 | Random Forest | 0.889* | 0.577* | 0.250* | 0.329 |
| 5 | Reg. Multinomial Regression | 0.788 | 0.492 | 0.180 | 0.232 |
| 5 | Support Vector Machine | 0.765 | 0.576 | 0.223 | 0.333* |
| 10 | Classification Tree | NA | 0.362 | 0.219 | 0.319 |
| 10 | Random Forest | NA | 0.690* | 0.295* | 0.393* |
| 10 | Reg. Multinomial Regression | NA | 0.633 | 0.245 | 0.264 |
| 10 | Support Vector Machine | NA | 0.685 | 0.255 | 0.379 |
| 100 | Classification Tree | NA | NA | 0.311 | 0.487 |
| 100 | Random Forest | NA | NA | 0.446* | 0.686* |
| 100 | Reg. Multinomial Regression | NA | NA | 0.415 | 0.585 |
| 100 | Support Vector Machine | NA | NA | 0.380 | 0.591 |

Note: * denotes the best performing method.

FIG. 5.1.2

Table B1.2 : Out of sample accuracy for a "moderate" data intruder, averaged over varying number of potential authors.

| # Training Documents | Model | Brennan-Greenstadt Corpus | Extended Brennan-Greenstadt Corpus | Twitter | Enron |
|---|---|---|---|---|---|
| 5 | Classification Tree | 0.357 | 0.249 | 0.176 | 0.253 |
| 5 | Random Forest | 0.928* | 0.689 | 0.263* | 0.337* |
| 5 | Reg. Multinomial Regression | 0.730 | 0.450 | 0.170 | 0.232 |
| 5 | Support Vector Machine | 0.832 | 0.703* | 0.217 | 0.334 |
| 10 | Classification Tree | NA | 0.385 | 0.219 | 0.327 |
| 10 | Random Forest | NA | 0.799 | 0.311* | 0.406* |
| 10 | Reg. Multinomial Regression | NA | 0.670 | 0.222 | 0.257 |
| 10 | Support Vector Machine | NA | 0.824* | 0.252 | 0.392 |
| 100 | Classification Tree | NA | NA | 0.317 | 0.498 |
| 100 | Random Forest | NA | NA | 0.486* | 0.700* |
| 100 | Reg. Multinomial Regression | NA | NA | 0.456 | 0.572 |
| 100 | Support Vector Machine | NA | NA | 0.394 | 0.600 |

Note: * denotes the best performing method.

FIG. 5.1.3

Table B1.3 Out of sample accuracy for a "sophisticated" data intruder, averaged over varying number of potential authors.

| # Training Documents | Model | Brennan-Greenstadt Corpus | Extended Brennan-Greenstadt Corpus | Twitter | Enron |
|---|---|---|---|---|---|
| 5 | Classification Tree | 0.355 | 0.268 | 0.178 | 0.286 |
| 5 | Random Forest | 0.962* | 0.821* | 0.313* | 0.509 |
| 5 | Reg. Multinomial Regression | 0.643 | 0.495 | 0.266 | 0.628* |
| 5 | Support Vector Machine | 0.839 | 0.807 | 0.219 | 0.339 |
| 10 | Classification Tree | NA | 0.466 | 0.257 | 0.676 |
| 10 | Random Forest | NA | 0.914* | 0.385* | 0.669 |
| 10 | Reg. Multinomial Regression | NA | 0.724 | 0.362 | 0.706* |
| 10 | Support Vector Machine | NA | 0.920 | 0.258 | 0.406 |
| 100 | Classification Tree | NA | NA | 0.415 | 0.838 |
| 100 | Random Forest | NA | NA | 0.608* | 0.901* |
| 100 | Reg. Multinomial Regression | NA | NA | 0.602 | 0.863 |
| 100 | Support Vector Machine | NA | NA | 0.537 | 0.741 |

Note: * denotes the best performing method.

FIG. 6.1

Table 6.1 Predictor variables calculated form the text of each document.

| Category | Data Intruder Proficiency | Description | Count |
|---|---|---|---|
| Bag of words (Content) | Sophisticated | Frequency of any word that appears in the text | > 1000 (Depends on text corpus) |
| Punctuation | Simple | Frequency of ! . ? # @ $ % & , ; : ( ) | 13 |
| Stop words | Moderate | Frequency of words like "the", "of", "and" | 174 |
| Stylometry | Simple | Frequency of *a* to *z* (ignoring case) | 26 |
| Stylometry | Simple | Frequency of 0 to 9 | 10 |
| Stylometry | Simple | Number of words | 1 |
| Stylometry | Moderate | Frequency of words with a mix of upper and lower case letters | 1 |
| Stylometry | Moderate | Frequency of words that have 1-30 characters | 30 |
| Stylometry | Moderate | Vocabulary richness (Yule's K) | 1 |
| Stylometry | Moderate | Flesch-Kinkaid reading level | 1 |

FIG. 6.2

Table 6.2 Summary of investigated datasets.

| Dataset | Document Type | Number of Potential Authors | Number of Documents | Average Word Count |
|---|---|---|---|---|
| Brennan-Greenstadt from Brennan et. al (2012) | Essays | 12 | 113 | 508.92 |
| Extended Brennan-Greenstadt from Brennan et. al (2012) | Essays | 45 | 699 | 497.62 |
| Yelp Online Reviews | Online Reviews | 50 | 5,000 | 187.55 |
| U.S. Senator Tweets from Xia et. al (2016) | Tweets | 100 | 198,265 | 17.55 |
| Enron Emails | Redacted Emails | 106 | 107,623 | 192.70 |

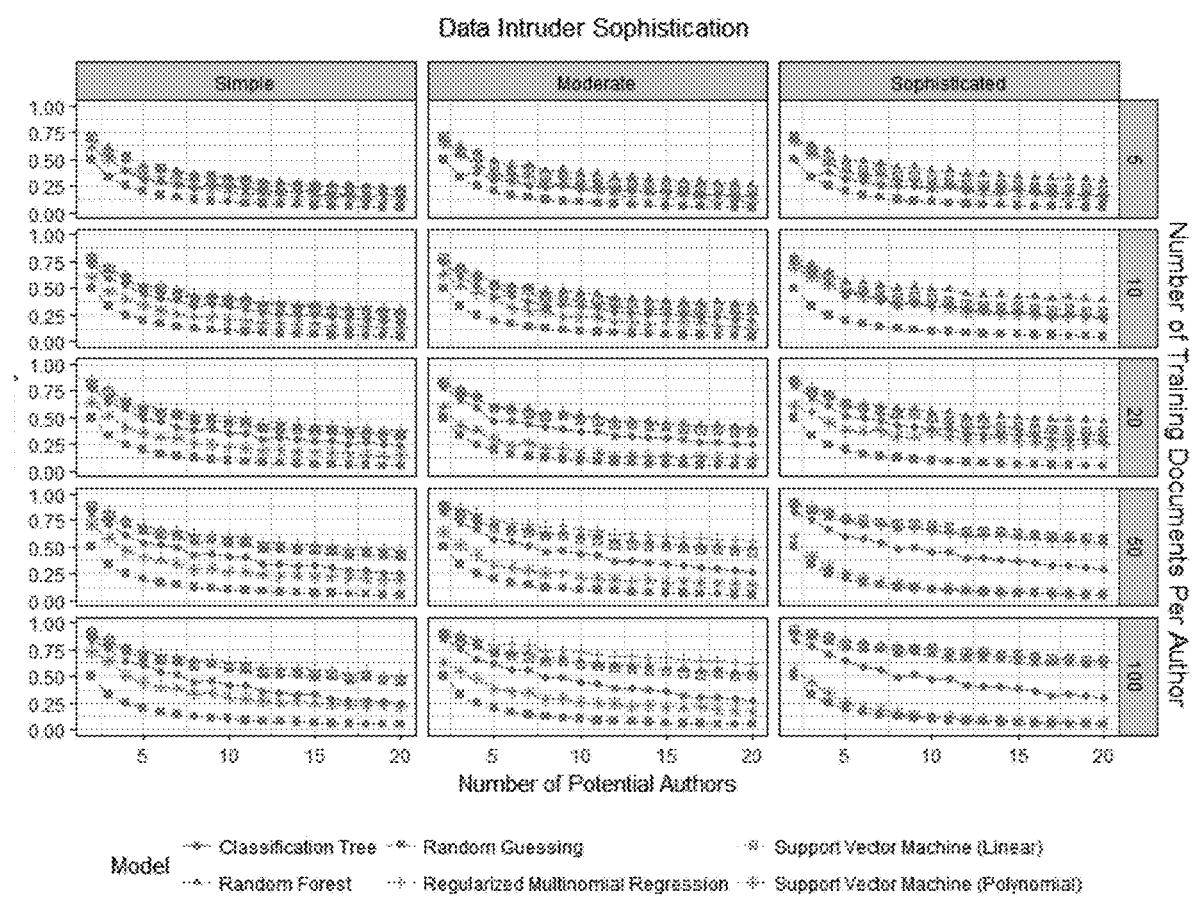
FIG. 7.1  Detailed out-of-sample accuracy results for the Yelp corpus.

FIG. 7.2

Table 7.2: Out of sample accuracy for a "sophisticated" data intruder, averaged over varying number of potential authors. Asterisks denote the best performing method.

| # Training Documents | Model | Dataset | | | | |
|---|---|---|---|---|---|---|
| | | Brennan-Greenstadt Corpus | Extended Brennan-Greenstadt Corpus | Yelp | Twitter | Enron |
| 5 | Classification Tree | 0.355 | 0.268 | 0.248 | 0.178 | 0.286 |
| | Random Forest | 0.962* | 0.821* | 0.420* | 0.313* | 0.509 |
| | Reg. Multinomial Regression | 0.643 | 0.495 | 0.262 | 0.266 | 0.628* |
| | Support Vector Machine | 0.839 | 0.807 | 0.347 | 0.219 | 0.339 |
| 10 | Classification Tree | NA | 0.466 | 0.365 | 0.257 | 0.676 |
| | Random Forest | NA | 0.914* | 0.502* | 0.385* | 0.669 |
| | Reg. Multinomial Regression | NA | 0.724 | 0.376 | 0.362 | 0.706* |
| | Support Vector Machine | NA | 0.920 | 0.419 | 0.258 | 0.406 |
| 100 | Classification Tree | NA | NA | 0.490 | 0.415 | 0.838 |
| | Random Forest | NA | NA | 0.700 | 0.608* | 0.901* |
| | Reg. Multinomial Regression | NA | NA | 0.747 | 0.602 | 0.863 |
| | Support Vector Machine | NA | NA | 0.748* | 0.537 | 0.741 |

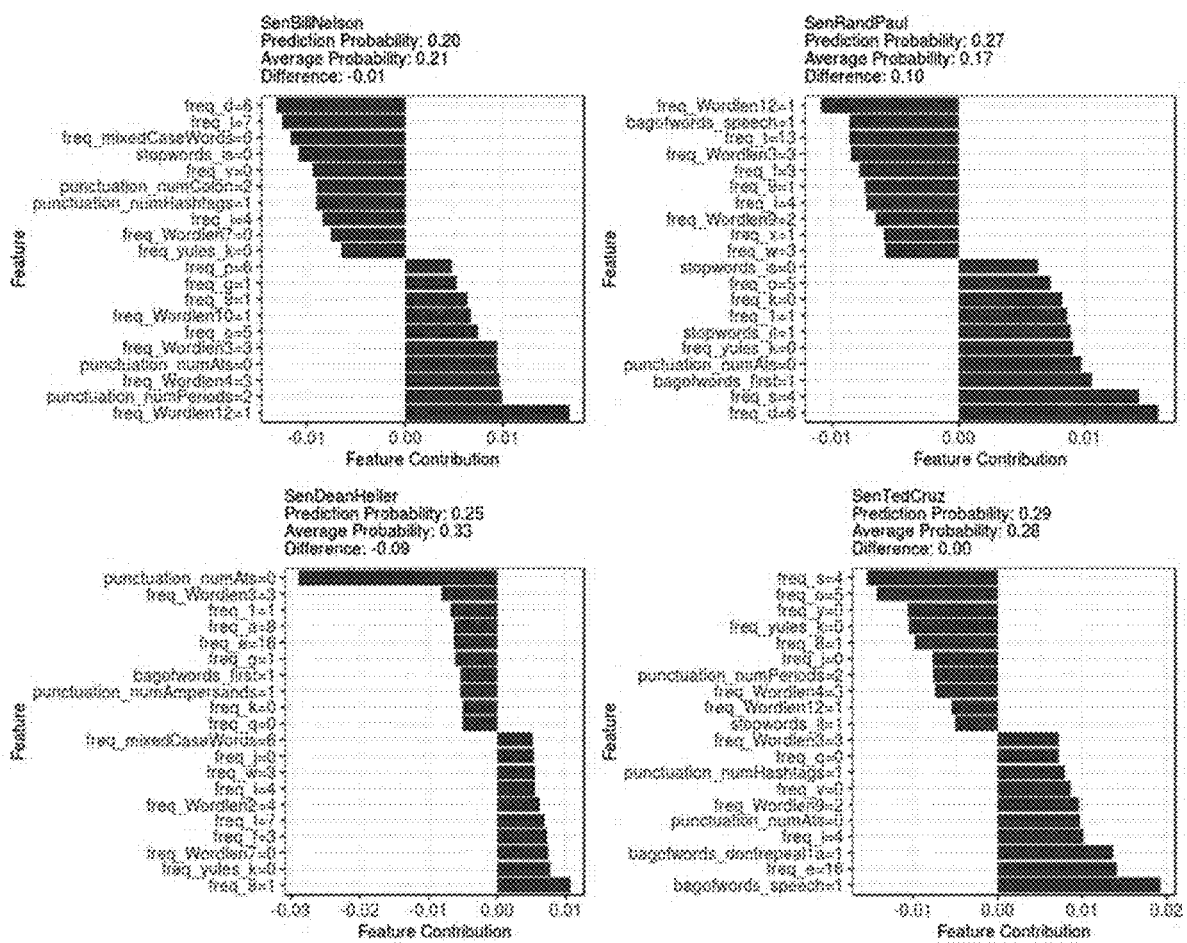
FIG. 8 Shapley values for explaining an attribution on the Twitter dataset.

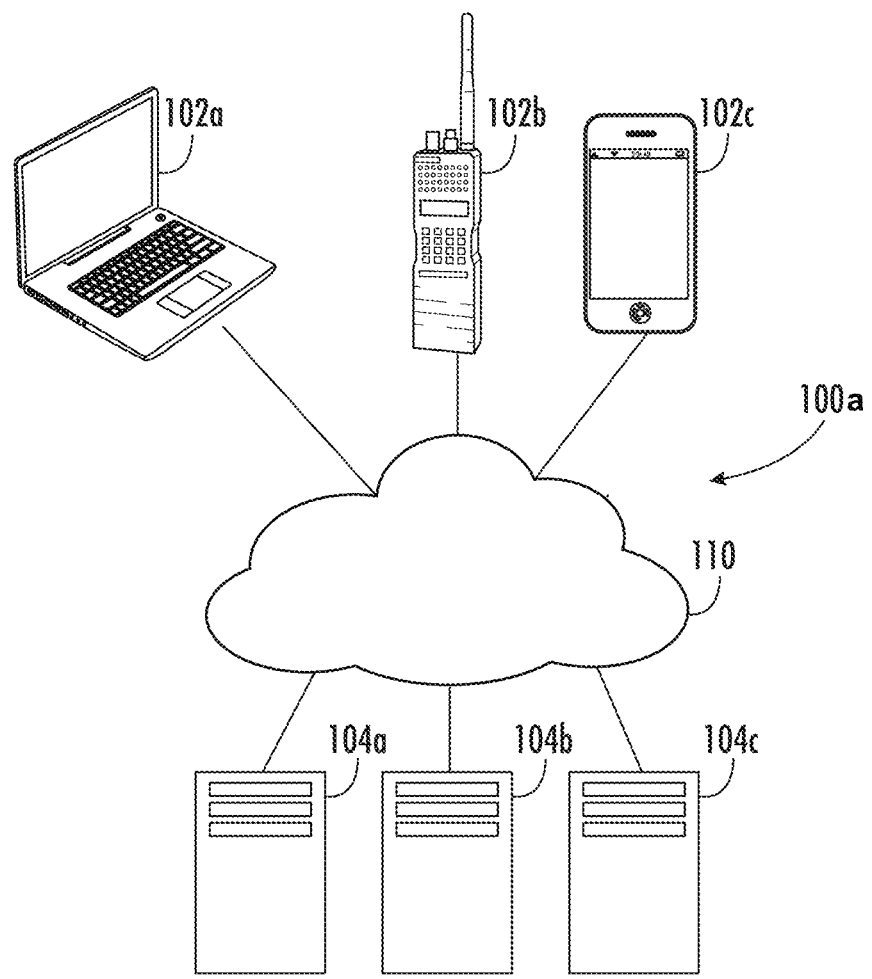
FIG. 9.1

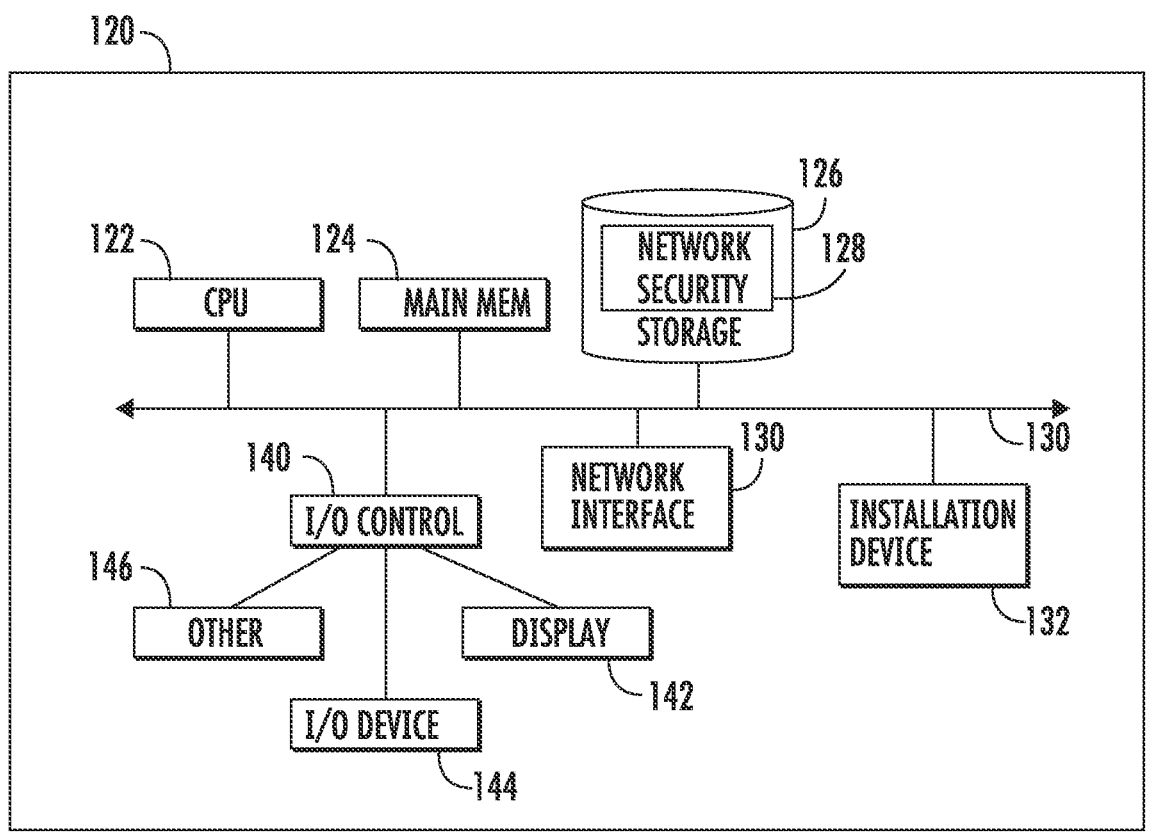
FIG. 9.2

IDENTIFICATION AND PERSONALIZED PROTECTION OF TEXT DATA USING SHAPLEY VALUES

BACKGROUND OF THE INVENTION

Background Introduction

Authors of online reviews on platforms such as Yelp, Amazon, and Glassdoor often assume that the reviews they contribute are anonymous. The subjects of such reviews, however, may seek to de-anonymize such content. For example, a Yelp user named "Birdzeye B" posted a negative one-star review about a California law firm. The maligned legal team identified and sued Ava Bird, obtaining a default judgment for over half a million dollars. ZL technologies also filed suit against Glassdoor to obtain the identities of anonymous authors by claiming they wrote libelous reviews about the mismanagement of their company. In another case, an accountant in California won an appeals court decision to confirm his belief that an author on Yelp named "Alex M" was a known female customer.

Yelp's senior director of litigation states that such cases "would really inhibit a website's ability to provide a balanced spectrum of views online and make it more doubtful that people would get the information they need to make informed decisions."

Firms may want to identify a reviewer for many other reasons. For example, a review platform may want to protect its reputation and identify high-volume reviewers with multiple accounts writing fake reviews. Also, a vendor may want to respond directly to a reviewer's concern on an external platform. For example, AMZ Tracker suggests vendors identify reviewers to respond to complaints by "comparing the date and time of the review with your sales records, or asking publicly by replying to the review." In addition to commercial reasons, other motives for authorship attribution include "doxing" authors, or exposing privacy vulnerabilities in the review platform.

Protecting the anonymity of authors in reviews, while the detailed discussion described herein, may be important for platforms that host user-generated content or for any author identification. Anonymity prevents retaliation for truth-telling and is a prerequisite for other related domains such as peer reviews of academic journal articles, teaching evaluations, consumer surveys, and criminal complaints. Many academic journals attempt to have both anonymous referees and authors, yet research shows that authors can be identified using citations or other textual content in the article. Teaching evaluations by students are also assumed anonymous and evidence shows that non-anonymous students rate their professors more positively than anonymous students.

Consumer surveys can also be designed to protect anonymity through randomized-response surveys to help "induce respondents to answer more truthfully." Further, strong privacy management practices provide consumers with a positive brand experience and lead to competitive advantage for platforms, while consumer privacy concerns can translate into negative brand effects. Moreover, the impact of information privacy and brand effects can be substantial, as platforms are famously sensitive to network effects, where different sides of the market can impact each other. If reviewers have privacy concerns, they may stop publishing certain content, which, in turn, impacts the utility derived by other consumers, firms, and advertisers.

To be concrete, consider a data intruder whose goal is to identify the author of an online review hosted by the data host (i.e., the online review platform). The data intruder could be the subject of the review such as a restaurant or vendor whose objective is to address customer service concerns or collect more data on their consumer profiles. Such a data intruder would have access to their own sales data, including transaction timestamps, customer names (for credit card sales), details of past transactions, and potentially some customer-level demographics. The data intruder could also be another platform. For example, Facebook once attempted to match its user data to "anonymous" patient data from several U.S. hospitals (data hosts) in order to figure out which patients needed special treatment. It is also conceivable that a company like Amazon may want to identify which of its customers reviewed Amazon's own private-label products on an external review site. We consider a scenario in which the data intruder attempts to identify an author of a particular online review by comparing their consumer data to the external review published on the review platform. On the other hand, the data host may try to prevent this from happening to protect their users' privacy and thereby increase the brand value of their platform. A key privacy decision for the data host is to determine which user information (e.g., first name, review date, location, email address, IP address, etc.) is publicly displayed. For instance, Angie's List requires that all reviewers are not anonymous, Yelp allows relatively anonymous reviewers, and the review platform Consumer Affairs allows users to use initials for their name or greater geographic areas for their location. Draconian protection policies that reveal nothing about the author would reduce utility for data users, the general public that uses online reviews to make decisions. In fact, Yelp's (2020) user agreement highlights this tradeoff explicitly by stating, "Other users may be able to identify you, or associate you with your account, if you include personal information in the content you post publicly. You can reduce the risk of being personally identified by using the Service pseudonymously, though doing so could detract from the credibility of your contributions to the Service."

REVIEW OF ART

Privacy and Online Reviews

Privacy as an area of study spans multiple fields, from economics and public policy to Computer Science and Information Systems (IS). It has been the focus of scholarly work with electronic health records, chat rooms and forum posting, blogs, and the blind academic peer-review system, among several other areas.

Within IS, there is an extensive literature on privacy and protection. One major area is on information privacy, which refers to the desire of individuals to control or have influence over data about themselves. Most works in this domain focus on providing theoretical constructs that explain user preferences and behaviors, which can be paradoxically in conflict.

This work fits into a related IS research area that develops tools and methods for database protection to facilitate safe sharing of data and analytics. In contrast to traditional settings, most data generated are unstructured in nature with online reviews. With few exceptions, the vast majority of research on privacy and protection of data addresses structured data stored in relational databases.

SUMMARY OF THE EMBODIMENTS

This work studies identifiability within online reviews, though its application may be more broadly applied. The context motivates the methodological approach that newly combines structured and unstructured data. For example, it pursues a first stage matching and filtering that resembling methods developed in the entity resolution and data linkage literature, following by text stylometric analysis in a second stage. This work discusses how the method fits into these fields next.

Narrowing the identity of an author to a single individual is usually quite difficult because a multiplicity of potential authors matches the posted data; such a search has a remote chance of succeeding. However, more granular structured data quickly narrows the number of potential authors and greatly improves the chances of authorship attribution. Once the number is small enough, the textual content further helps to identify an author.

Online reviews are an important source of information on products and services for consumers and firms. Although incentivizing high-quality reviews is an important business objective for any review platform, the method and system herein shows that it is possible to identify anonymous reviewers by exploiting the characteristics of posted reviews. Using data from Yelp and the inventors' two-stage authorship attribution methodology, the system herein demonstrates that the ability to identify an author is determined primarily by the amount and granularity of structured data (e.g., location, first name) posted with the review and secondarily by the author's writing style. It shows that 75% of the 1.3 million users in the data are identified by three structured variable combinations. For the remaining 25%, when the number of potential authors with (nearly) identical structured data ranges from 100 to 5 and sufficient training data exists for text analysis, the average probabilities of identification range from 40 to 81%. The inventor's findings suggest that review platforms (or other platforms hosting user generated content including email platforms) concerned with the potential negative effects of privacy-related incidents should limit or generalize their reviewers' structured data when it is adjoined with textual content or mentioned in the text itself. The inventors also show that although protection policies that focus on structured data remove the most predictive elements of authorship, they also have a small negative effect on the usefulness of reviews.

BRIEF DESCRIPTION OF THE DRAWINGS

FIG. 1 shows a flowchart of the attribution method steps.
FIG. 1.1 shows Table 1.
FIG. 1.2 shows Table 2.
FIG. 1.3 shows Table 3.
FIG. 2 shows out of sample accuracy results.
FIG. 3 shows that the data intruder will "usually" identify an anonymous reviewer by plotting the points on FIG. 2 that have an average probability of identification equal to or greater than 50%.
FIG. 3.1 shows Table 4.
FIG. 3.2 shows Table 5.
FIG. 3.3 shows Table 6.
FIG. 3.4 shows Table 7.
FIG. 4 provides expanded results for when the size of the training sample per author is between 5 and 100.
FIG. 5.1 shows Table B1.
FIG. 5.1.1 shows Table B1.1.
FIG. 5.1.2 shows Table B1.2.
FIG. 5.1.3 shows Table B1.3.
FIG. 6.1 shows Table 6.1.
FIG. 6.2 shows Table 6.2.
FIG. 7.1 shows a detailed out-sample from Yelp data.
FIG. 7.2 shows Table 7.2.
FIG. 8 shows Shapley values for a given Twitter data set.
FIG. 9.1 shows a network diagram of different components of the system.
FIG. 9.2 shows certain hardware components for use with the system.

DETAILED DESCRIPTION OF THE EMBODIMENTS

Authorship Attribution Algorithm

The context of online reviews creates conceptual differences when compared to a database quality field. Because a large percentage of an organization's data can be textual, many methods to identify duplicate records in databases also employ text-based techniques.

For example, a canonical problem in these subdomains is to identify different representations of the same entity by comparing a street address field: "44 West Fourth Street" versus "44 W. 4th St." Though technically the data are textual, they are also relatively structured, allowing for effective use of matching methods such as exact matching between two text entries, partial string matching through distances measures, or cosine similarity. This distinction highlights a key difference between the inventors' methodology and those traditionally used in the database field. Specifically, the inventors' second stage approach (details of both stages below) uses thousands of input features that capture more nuanced aspects of the given text, such as readability, style, and general content. The high-dimensional approach is necessary for accurate results, given the truly unstructured nature of user-generated content versus structured text fields in curated relational databases. Note also that the entity-resolution and database-linkage methods are traditionally applied for database cleansing of a single, internal company database. The inventors' focus is the integration between separate databases, one of which is external to the data intruder.

The system's second stage approach is closer to the field of stylometry (also known as authorship attribution), which aims to identify authors based on their textual content. The method is consistent with the authorship attribution literature in that the second stage is supervised, i.e., the anonymous text is assigned to an author, given a set of candidate authors for whom text samples (i.e., training data) are available. Previous works investigated larger training datasets: At least 10 training documents per author or 6,500 words per author.

Motivated by online reviews, but not limited thereto, the system and method herein is the first to accurately draw conclusions from a limited number of writing samples that can be used for training a classifier (e.g., 5 training documents per author or equivalently hundreds of words per author). It also incorporates both the structured data (first stage) and textual content (second stage) of a review. Further, within the authorship attribution literature, key issues are still not well understood, such as (i) how much (training) data are necessary to reverse engineer the true author of an anonymous text document, (ii) what the best modeling approaches are and which features are most important to extract from the text for authorship attribution, and (iii) what are the resultant implications for protection strategies that can mitigate the risk of privacy breeches. This system aims to fill these gaps in the literature in the context of online reviews.

Focusing on the evaluation of the authorship attribution method, a database is said to be k-anonymous when each person contained in the database cannot be distinguished from at least k−1 individuals also in the data. Specifically, in this context, some users are uniquely identifiable (k equals one) simply due to the nature of user generated content. To understand the scope of the potential privacy problem, it is also insightful to examine the most common reviewer profiles, for example, those who have the most common name or location in the dataset. Thus, when evaluating the effectiveness of the authorship attribution method and protection policies, we examine the full distribution of the sizes of groups of users that cannot be distinguished from each other.

Authorship Attribution Method

As illustrated in FIG. 1, the process begins with an online review (or other content) being published 1110 subject to the platform's policy regarding which user information (e.g, first name, review date, location) to publicly display 1120. Once the data intruder sees the external review that it wants to de-anonymize, it uses its own customer database with structured data (full name, email address, some demographics, and details of past transactions) and optionally writing samples for each customer to perform the authorship attribution. In the first stage 1140, the data intruder retains consumers as potential authors that match the observed structured data in the target review. The second stage 1150 rank orders the candidate authors by the probability of authorship estimated through a supervised text-based analysis.

First Stage

To formally discuss the authorship attribution method, we first introduce some notation. We label the data intruder database as D. Each row, $D_i$ contains structured data (username, first name, or location) for customer i. Let t be the target review published on the review platform with accompanying structured data (e.g., different username, location). The data intruder then computes $N_t$ as the total number of authors in D that (approximately) match the structured data of author t. $N_t$ increases when the structured data on the review platform is generalized (e.g., larger geographical areas) by the data host. The system performs exact matching, however, when the data intruder is worried about the author strategically using fake information (like a random location), then soft-matching can be used to cast a wider net while still greatly reducing the number of potential authors in D. The probability that author i is the author of target review t for the first stage is equal to $1/N_t$ for all authors and the set of $N_t$ authors in D is defined as $N^*_t$.

Second Stage

The second stage of the authorship attribution system and method relies on the data intruder having access to at least a single writing sample for each candidate author that can be used for stylometric analysis. If such data is not available, then the system and method conclude with the first stage with each potential author estimated as equally likely have written the target review. When the data intruder is a multinational firm like Facebook or Amazon, then writing samples can be compiled from a number of sources, including customer emails, voice transcriptions, reviews or posts on their own website, and so on. For other type of entities (e.g., restaurants, small businesses), activity on social networking sites can be harvested; the inventors also note the recent proliferation of data brokers whose service is to provide data (e.g., writing samples) for a list of individuals based on each individual's digital activity.

Having narrowed down the number of potential authors in the first-stage filtering and given the presence of training data, in the second-stage, the system views the problem of inferring authorship from the text of a document as a supervised learning problem. Formally, the method predicts the author $Y_t$ for document t and $Y_t \in N^*_t$. Let xt denote a vector of features extracted from the text, such as the count variables described herein for the text.

The features (or variables) include frequencies of numbers, all words in the English language including misspellings and entries with no spaces (e.g., sdfwes2#w), multi-word phrases (n-grams such as the 4-gram "the cat 8 dog"), stop words (e.g., him, the, A), punctuation, multi-word phrases with ampersands (e.g., one&two), frequencies of mixed case words (e.g., mixedCasewords), quotations, and other special characters, and linguistic variables widely used in the linguistics literature such as compound words, positive vs. negative contractions, verbs, nouns, enumeration schemes, topics, and grammar specifics. Note that multi-word phrases can number in the millions and for computational efficiency, we suggest to only use those multi-word phrases that have appeared previously in the authors' known authorship documents. In case there is not enough data to fit some of these features using this model, a custom-built process may be used.

In experiments, the inventors compared two different machine-learning methods: random forest and support vector machines (SVM).

For SVM, the inventors used function $\phi$ with kernel $K(xi,xk)=\phi(xi)T\phi(xk)$ to optimize $m=1, \ldots, Nt$ SVM models. The m-th SVM model minimizes $$\min_{w^m, b^m, \xi^m} \frac{1}{2} w^{m^T} w^m + C \sum_{i=1}^{n} \xi_i^m, \qquad \text{EQ (1)}$$

where $i=1, \ldots, n$ indexes the training data, C is the penalty parameter of the error term, $\frac{1}{2} w^{m^T} w^m$ is the regularization term for the textual feature vectors x and $\xi_i^n$ is the smallest non-negative number satisfying the constraints $(w^{m^T}\phi(xi)+b^m) \geq 1-\xi_i^m$ if Yi=m, else $(w^{m^T}\phi(xi)+b^m) \leq -1+\xi_i^m$ if Yi≠m. For each SVM m, $w^{m^T}\phi(xi)+b^m$ represents the hyperplane separating the feature vectors xi for author Yi. To classify the target document t, the inventors choose Yt, corresponding to arg max $w^{m^T}\phi(xt)+b^m$.

For random forest, the inventors use $m=1, \ldots, N_t$ tree-based classifiers, $h(x=(x1, x2, \ldots, xn), \Theta m)$, where xi is the textual feature vector and $\Theta m$ are independent identically distributed random vectors generated from the tree construction. For each of 500 trees, we sample the number of features equal to $\sqrt{p}$ and sample xi with replacement. To classify the target document t, the method outputs the vector of probabilities for each input xt and choose Yt with the plurality vote.

These two techniques are both scalable and so well-suited to the problem of predicting the author of a review from a moderate-sized set of potential authors. Although recent authorship attribution studies have used regularized multinomial logistic regression, the computational cost of random forest and SVM when faced with a large number of potential authors (classes) is minimal in comparison to these alternative classification methods. The computational complexity of training random forest is $O(Nt*ntree*\sqrt{p}*n \log(n))$, growing linearly in the number of potential authors.

For SVM, such a precise expression of computational complexity is difficult to derive. Regardless of the exact system and method used to solve the quadratic optimization problem, the asymptotic computational cost grows, depending on the penalty parameter C and the number of samples n, that is, the main computational cost for training SVM does not align with the number of potential authors (classes). In addition to the scalability, in the inventors' experiments, the predictive capability of regularized multinomial regression was dominated by random forest. These two classifiers also cover the spectrum of assumptions with respect to the classification boundaries. SVM is naturally viewed as making a linear boundary assumption. In contrast, random forest is a non-parametric methodology.

—Text Ingestion Processing within First Stage

In some situations, there may be less data about a given potential author (few samples of the writing), there may be another approach possible.

The text ingested may be written within R, an open source language and statistical computing environment, and may include several supporting functions. The goal of this section is to outline the basic code structure and technical requirements.

First, text documents and if available author labels may be read in using the basic R functions. This ingestion may include .txt files, Excel files, word documents, PDF's, and so on. There may be technical challenges associated with ingesting proprietary filetypes (e.g., PDF's) with most of these being solvable.

After ingestion, each document may be fed into a custom-built process that processes the text and measures thousands of linguistic and stylometric variables that may be present in writing. There are several supporting open source libraries that may be used to compute the different variables: the "tm," "koRpus," "stringr," and "tokenizers" libraries. These libraries provide prewritten functions that tokenize text, perform pattern matching and phrase extraction, and so on. The output of this function may be a flat table with triplets <document, variable, value>.

This table of triplets may then be fed into another helper function that reorganizes everything into a format that is human readable. Specifically, using base functions in R, the data may be reorganized into a table with text-based features (variables) along the rows, and authors and K docs (documents with known authorship that are not in question) along the columns. The Difference (Diff) and Ratio columns may also be computed and added to the table. The first table entry is the relative frequency (e.g., 8%) of a specific variable (e.g., negative contractions like "can't" or "don't" or the two-word phrase "I helped") for a particular Q document (where authorship is unknown) and author A. The second table entry in the same row is the relative frequency (e.g., 3%) of the same variable for author B. Diff presents the difference between these relative frequencies (8%–3%=5%). Larger numbers mean that (i) the variable occurred frequently in the K documents for author A compared to author B; (ii) the variable helps differentiate between authors. Also, a positive number means the variable is more frequently used by author A, whereas a negative number means the variable is more frequently used by author B. The next entry ("Ratio") presents the ratio of author A and author B values (8%/3%=2.67). Unlike Diff, Ratio identifies variables that differentiate between authors even when the relative frequencies are not large. For instance, the misspelled word "dawg" can be used infrequently by author B in the K docs but never by author A. Consequently, "dawg" can be one of the smallest values in the Ratio column among hundreds of thousands or millions of potential variables, but will rank poorly in the Diff column. Ratio values close to zero indicate that the variable matches author B, while ratio values well above one favor author A.

Functions from two open source libraries may then be used to output into a .xlsx spreadsheet with cells also highlighted or noted according to their relevance. Additional analysis using the same methodology can expand to more than two authors using pairwise comparisons. Also, a relative frequency column can be computed for any number of authors.

—Text-Based Features for the Second Stage

The variables used in the second stage may capture different aspects of content and style of writing, consistent with the literature. Specifically, the method may calculate four groups of variables: bag of words, stop words, punctuation, and stylometry (see Table 1, FIG. 1.1) in the experimental data discussed herein. Other variables may be used including n-grams and other linguistic categories like positive contractions that may be used to more uniquely identify authors.

As summarized in Table 2 (FIG. 1.2), in an experiment, the inventors use data from the Yelp academic-challenge dataset available at http://www.yelp.com/dataset to illustrate the effectiveness of the inventors' authorship attribution method. It includes more than 5 million reviews from approximately 1.3 million reviewers. For each reviewer, the dataset provides a self-reported name field that we parse into first and last name and treat as structured data. Of reviews, 89.6% are posted under a first name that appears in data published by the US Social Security Administration (2019) on the frequency of given first names in the population of U.S. births where the individual has a Social Security number. This strong overlap between the two databases provides evidence that Yelp users often post under real first names. Note that the percentage of actual first names being used is likely higher than 89.6%, as the remaining 10% of reviews tend to contain names written in different languages (e.g., with Chinese characters), which do not appear in the Social Security Administration's database. For last names, users are much less likely to provide reliable information: the percentage of reviews without any self-reported last name is 98.9%. When a last name is listed, it appears in the US Census Bureau's (2016) surname database 69.9% of the time. When a user chooses to not self-report a structured data variable, such as last name, we code this as "Unknown" for the inventors' empirical analysis.

—Performance of the First Stage of the Authorship attribution Algorithm

As mentioned previously, the data intruder may attempt to identify a reviewer by comparing the review to their customer database D to see if a unique match exists among common variables such as name or email address. To validate the first stage of the authorship attribution algorithm, the inventors studied how the number of potential customers varies depending on the characteristics D't of a hypothetical target review t. For instance, if the first name with the target review was a common one, such as "John," we expect a large number of candidate reviewers to match this value. In fact, this is the most common first name in the Yelp dataset with 12,120 instances. In contrast, for a more uncommon name, such as "Yuqing," the number of matching potential authors should be smaller. There are 10 reviews by Yuqings in the Yelp data. Table 3 (FIG. 1.3) shows exactly this type of pattern. For example, when matching against last names only, distinctive last names quickly narrow the number of potential authors, whereas a user not entering any last name keeps the number of potential authors at 1.31 million. Table 3 also shows that from over 1.3 million users, only two pieces of structured data (first name+last name) result in Nt=1 for 50% of combinations and three pieces of structured data (first name+last name+business/service purchase) result in Nt=1 for 75% of the combinations. In terms of k-anonymity, Table 3 shows that k-anonymity=1 for the Yelp dataset, since there exists at least one user who is uniquely identified by their structured data. We expect the performance of the first stage to hold even if the number of customers in the data intruder's database is larger than the dataset we analyze here: the number of candidate authors Nt will decrease as matching is performed with more granular structured data. When Nt is greater than 1, the data intruder proceeds to the second stage of the authorship attribution algorithm.

—Performance of the Second Stage of the Authorship attribution Algorithm

The inventors investigated the efficacy of the second stage by dividing the reviews into training and test sets. In so doing, they varied the number of potential authors and amount of available training data, both of which control the general difficulty of the problem. For example, if there are only two potential authors, then the problem of author identification reduces to a standard binary classification problem. For larger potential author sets, developing accurate predictions is more challenging because the cardinality of potential authors is much larger. To derive implications about the real-world feasibility to attribute authorship using statistical methods, the system also varied the number of training samples from 5 training documents per author to 100 training documents per authors. For each dataset, from the text of each document, the system calculated all text-based variables in Table 1 and varied the data intruder's technical sophistication by training different machine-learning models with the three nested categories of features (simple, moderate, and sophisticated).

Finally, when testing the proposed algorithms, the system compared out-of-sample predictions against withheld true authorship labels. Out-of-sample accuracy results appear in FIG. 2.

(FIG. 4 provides expanded results for when the size of the training sample per author is between 5 and 100. FIG. 4 provides out-of-sample accuracy results for the Yelp data. Accuracy consistently improves as the sophistication of the data intruder and the size of the training data increases.)

Random guessing (the green dotted line) assumes that the data intruder uses the structured data only with a probability of identification equal to 1. Compared to random Nt guessing, the probabilities of identification using machine-learning methods on text-based features are much larger for any level of sophistication, including "simple," which uses only frequencies of punctuation, letters, and numbers. The inventors varied the input features to quantify the amount of discriminative information contained in each set of predictors and understand the practical difficulty of the prediction problem. The results show that the most informative variable group is the bag of words, because the sophisticated platform consistently achieves the highest out-of-sample accuracy rate. It is noteworthy that even a simple or moderately sophisticated platform that uses variables that require less technical sophistication to measure achieve a reasonably high-level of accuracy. In other words, we find evidence that even a simple data intruder, one that does not use bag of words or other content-driven features, will still be able to perform authorship attribution when given enough writing samples on each potential author.

FIG. 3 shows that the data intruder will "usually" identify an anonymous reviewer by plotting the points on FIG. 2 that have an average probability of identification equal to or greater than 50%. When the training data size is large, a sophisticated platform using all the textual features can, on average, identify an anonymous reviewer correctly from over 70 potential authors.

Note that data privacy can be poor even if the average accuracy rates in FIG. 2, which are for a single target review, are relatively low. One reason is that the data intruder may have multiple target reviews written on the online review platform by the same author and the data intruder only has to identify the author of one such review. For example, FIG. 2 shows that the average out-of-sample probability of identification with 5 training data and 50 anonymous authors is about 25% (random guessing is 2%). Although this may not seem large, if there are ten reviews written by the same author, Yt, on the online review platform, then the data intruder has ten separate chances to identify the author. Conservatively, this yields a $1-0.75^{10}=94\%$ chance of identifying the true author of at least one of the ten reviews. Moreover, if one of the target reviews is particularly revealing, then the rest of the reviews are also compromised.

—The Effect of Data Protection on Review Usefulness

The results presented indicate that an online review platform should consider carefully which elements of their users' structured data are publicly visible, as it directly relates to user identifiability and viability of the second stage of the authorship attribution algorithm. Yet, certain structured data may be critical for fostering trust and enhancing the user experience. This section shows that there exists a tradeoff for an online review platform in protecting its users from being identified and having its online reviews provide utility to the general public.

Specifically, using the useful vote count for each review and the inventors' authorship attribution methodology, the system shows that reviews that reveal less structured data are harder to identify, but also receive fewer useful votes on average.

With the datasets reviewed, the same structured data fields are posted alongside every review making it difficult to estimate the impact of changing the available fields. To overcome this challenge, the inventors use structured data revealed within the text itself as a source of variation, allowing them to estimate (albeit imperfectly) the impact of structured data on the review's perceived usefulness. Moreover, beyond an online review platform reducing the amount and granularity of the structured data posted alongside a review, it would also become necessary to protect the review text itself when this information is revealed.

Addressing the question of whether reviewers reveal structured data in the text itself may be important because more structured data could reduce Nt from the first stage of the inventors' authorship attribution system and method. For instance, the sentences "I've had my scarf for 10 days and I love it! It is warm and stylish for a 25-year old woman in Chicago" would create the structured data variables "gender," "age," "transaction date," and "location." We may randomly select one review from each of 1,035 unique reviewers on Yelp and ask MTurk workers yes/no questions about whether the review text contained an age, transaction date within seven days, gender, race/ethnicity, or specific geographical location. We send each review to three MTurk workers and take the majority share vote. Consistent with best practices we require workers to be Masters (workers who have demonstrated high performance over time) and to be located in the United States. Results are shown in Table 4 (FIG. 3.1) with approximately 16% of textual reviews exposing at least one structured variable in the text.

Location, which could be matched to billing or delivery address, and gender are the two most often revealed pieces of information.

Next, examine how the amount of structured data revealed in the review text relates to data privacy (probability of identification) and data utility (usefulness of reviews). We create a variable named Text Revelation, defined as the count of structured data revealed in the text. Table 5 (FIG. 3.2) shows that as the review text reveals more personal information (i.e. Text Revelation increases), the probability of identification of a reviewer and the average usefulness of reviews increase. Quantiles are reported in the table because the exact value of Nt depends on the uniqueness of the structured data and level of protection pursued by an online review platform or the author.

With respect to the authorship attribution results, regardless of whether the information is posted alongside a review or in the text itself, as the amount and granularity of structured data decreases, the number of potential authors from the first stage increases. The number of candidate authors from the first stage impacts the ultimate second-stage accuracies. If the review is sufficiently protected to remove all structured data, then the candidate number of authors is so large that authorship analysis becomes computationally infeasible. In contrast, if structured data is revealed, in a majority of cases, the data intruder will have a substantial chance at identifying the author of the target review.

Table 5 also shows that an increase in Text Revelation aligns with an increase in the usefulness of reviews. To test this more rigorously, we use regression to explain review usefulness with a variety of standard features, such as the Flesch-Kinkaid reading level, a measure of the readability of the review. Summary statistics for the variables used appear in Table 6 (FIG. 3.3). This disclosure previously discussed all variables with the exception of polarity (e.g., sentiment or tone), which is measured using a weighted average of words that are tagged by their sentiment (positive, negative, or neutral) according to a dictionary. The exact implementation the system uses is contained in the "qdap" library in R.

Results for three regression models appear in Table 7 (FIG. 3.4), where we consistently find that an additional count of structured data aligns with a higher level of usefulness. Therefore, we can surmise that protection policies that reduce the amount of structured data would result in less useful reviews—though, it is important to note that the effect sizes are relatively small. Reducing Text Revelation by one would lower the average useful count by only 0.2 votes.

Note that these models control for word count, which is important because higher Text Revelation usually implies a longer review. Moreover, the interaction term between Text Revelation and word count reveals that additional structured data in the text becomes slightly less impactful as the review increases in length and readers may focus on other content. We also find that more critical reviews tend to be seen as more useful (negative and significant effect for Review Rating), and that lexical diversity also improves perceived usefulness (vis-à-vis the effect for Yule's K).

In summary, the results in this section reinforce the notion that protecting structured data, whether posted alongside a review or within the review text itself, improves reviewer privacy.

While there is a negative externality associated with generalization or redacting structured data, the negative impact on review usefulness appears to be relatively small. This suggests that the benefits outweigh the costs for online review platforms pursuing stronger privacy management practices that reduce privacy concerns.

Methodologically, beyond systematically combining both structured and text data for authorship attribution and data linkage, the system and method contributes to the performance assessment of the second stage of the system and method which stratified by the amount of effort put into feature engineering and when training data is scarce rather than plentiful. The inventors have found that as few as five training documents (or, equivalently, hundreds of words per author) can be enough to attribute authorship at a level several multiples higher than random guessing, even when the number of potential authors is large. To demonstrate that the inventors' results have relevance beyond the online review setting, in Appendix B we provide results from applying the system and method to four other datasets that vary in terms of document type, length, formality, and style of writing. We demonstrate consistently high accuracy results using Tweets, corporate emails, and long-form student essays.

Additional Second Stage Results from Additional Datasets

The inventors analyzed four additional datasets summarized in Table B1 (FIG. 5.1). The data vary in terms of document type, length, formality, and style of writing. For example, Twitter is by construction short and informal, whereas the two Brennan-Greenstadt corpora are long-form student essays.

The Brennan-Greenstadt corpus is based on a study conducted through Drexel University and contains 12 student authors who volunteered their time. The Extended-Brennan-Greenstadt corpus contains authors solicited through the Amazon Mechanical Turk platform. Using a rigorous quality control protocol, 45 out of 100 authors were kept in the final dataset. To form the corpora for each author, the writing samples were combined and split into approximately 500-word passages.

The US Senator Tweets data comes from Xia et. al (2016) who collected in July 2014 using Twitter's API for official accounts belonging to U.S. Senators. Specifically, accounts in the data are registered to 54 Democratic Senators, 46 Republican Senators. The data consist of approximately 200,000 tweets (documents), including the most recent 3,000 from any single user within the set of 100 accounts. While at first glance Twitter may seem like an unlikely platform on which to apply authorship attribution algorithms, the dataset has distinct advantages. First, we illustrate the generality of the methodology by considering a dataset that is still based on user-generated web content, but from a different information system. Second, we know the true author of each document, providing an objective testing ground for the inventors' general methodology.

Third, driven by accusations of organized campaigns on Twitter to spread misinformation to influence elections, there is growing interest in methodology to link several distinct Twitter accounts that may be actually controlled by a single entity. The inventors' research has relevance to this problem.

The fourth dataset is the Enron email corpus, consisting of email messages sent by Enron staff in the course of day-to-day business along with the email's authorship (sender) label from 168 different addresses. The dataset is originally sourced from the US Federal Energy Regulatory Commission's investigation into the collapsed energy firm. The particular version of the data we use comes from a firm Nuix, who volunteered to examine the prevalence of PII within the Enron data. To demonstrate their ability to remove personal information from the text of corporate communications, Nuix published a redacted version of the email dataset, where all personally identifiable information has been removed.

Results in Tables B1.1 (FIG. 5.1.1), B1.2 (FIGS. 5.1.2), and B1.3 (FIG. 5.1.3) show stable and consistent findings across datasets. As with the Yelp results presented in the main text, we see Random Forest tends to be the most accurate classifier and that accuracy rates can be meaningfully high even with few training documents. Thus, these results provide evidence that the inventors' results will hold generally and translate across different text domains.

De-Anonymization Methodology

The variables used in the inventors' approach capture different aspects of content and style of writing, consistent with the literature. Specifically, the system may calculate four groups of variables: bag of words, stop words, punctuation, and stylometry (see Table 6.1, FIG. 6.1).

The bag of words group includes a set of count variables for every word used in any text document. For instance, the sentence "Technology is outpacing existing privacy protections in our laws." would create the variables "technology", "outpacing", "existing", and so on, where each variable is a count of the number of times the corresponding word appears in any document in the dataset. Such counts play a key role in text mining generally and are the input for a large number of content analysis methods, including probabilistic topic modeling. Because the dimensionality of bag of words features can easily be in the thousands if not larger, this group of variables would require a "sophisticated intruder" with technical knowhow.

The three other sets of variables may not pose technical difficulties because they are lower dimensional constructs that measure aspects of style instead of content. The stop words variables include 174 separate count variables of semantically empty words, such as "a", "and", and "the", which do not have semantic meaning but are necessary constructs of the English language. As such, these words help capture the formality and style of the author's writing. The punctuation group includes 14 separate count variables for different punctuation (e.g., "!","#","$", etc.) to again capture style of writing. Finally the stylometry variables may include just under 75 separate count variables, including seminal measures, like the Flesch-Kinkaid grade level and Yule's K, in addition to many variables that have been shown collectively to help discriminate between authors in other contexts but are less interpretable. Measures of readability (also known as reading levels) are numerical scores that indicate how easy or difficult a given piece of text is to comprehend. There are various measures of readability, though work in similar contexts (online reviews) focuses primarily on the reading level measure called the Flesch-Kincaid Grade Level. This measure of readability combines different factors, such as word count and number of syllables, to estimate the comprehension difficulty of a given piece of text.

While originally developed by the U.S. Navy for screening of enlisted personnel, the Flesch-Kincaid Grade Level has remained popular due to its fast calculation (it is an automated statistic within Microsoft Word) and history of reliable results. Yule's K is similar in spirit to reading levels, and aims to compute the lexical diversity within a given text. Specifically, it is a measure of vocabulary richness based on the rate at which words are repeated. The other stylometry variables include the number of words of length K (for K=1, 2, ..., to the largest observed word length), number of upper case words, number of lower case words, number of mixed case words, how often numerical digits are used, counts of how often each letter was used, n-grams, and so on.

The goal is to use the text-based features discussed above to predict authorship. As such, we view the problem as a supervised learning (i.e., classification) one. In experiments, the authors compare different machine learning methods: classification trees, random forest, regularized multinomial regression, and support vector machines (SVMs). Note that for even the most interpretable method, it can be challenging to understand why a given test document has been attributed by the model to a particular author—a significant concern for several real-world applications. A data intruder may require such interpretability to meet the bar for "actionable attributions", whereas a platform or user could use such insights to develop a protection strategy.

Experimental Framework

The inventors analyzed five separate datasets summarized in Table 6.2 (FIG. 6.2). The data vary in terms of document type, length, formality, and style of writing. For example, Twitter is by construction short and informal, whereas the two Brennan-Greenstadt corpora are long-form student essays.

For each dataset, from the text of each document, the system may calculate all text-based variables discussed above and vary the data intruder's sophistication by training different machine learning models with the three nested categories of features (simple, moderate, and sophisticated). Importantly, the experiment also varied the number of potential authors and amount of available training data—both of which control the general difficulty of the problem. For example, if there are only two potential authors, then the problem of author identification boils down to a standard binary classification problem. On the other hand, for larger potential author sets, developing accurate predictions is more challenging since the cardinality of potential authors is much larger. To derive implications about the real-world feasibility of a data intruder to attribute authorship using statistical methods, we also vary the number of training samples from extremely small (just 5 training documents per author) to larger (100 training documents per authors).

Finally, for each corpora we know the true authors of each document, allowing us to measure objectively the error-rate of the proposed methodology. Specifically, when testing the proposed algorithms, we withhold the actual author information and compare our out-of-sample predictions using the text of the document against these withheld, true labels.

Results

Due to space constraints, we present here detailed results for the Yelp dataset in FIG. 7.1 and summary results for a sophisticated data intruder for all datasets in Table 7.2 (FIG. 7.2). Thus, there is evidence that the results we discuss next are in fact general findings that can translate across different text domains.

We see from FIG. 7.1 several notable patterns. First, matching our intuition, the accuracy of identification degrades as the number of potential authors increases and amount of training data decreases. Interestingly, we see that even with very small sample sizes, authors can be identified by their writing at relatively high accuracy rates. For instance, a simple data intruder can identify the true author from 20 potential authors at about 25% accuracy—approximately 5 times higher than with random guessing. This result demonstrates the power of capturing stylistic choices of authors through punctuation and other relatively simple count variables.

Data intruders are rewarded for investing in higher dimensional models that utilize more complex features, as results generally improve from simple to moderate to sophisticated data intruders. In fact, a sophisticated data intruder can identify the true author from 20 potential authors at almost 40% accuracy with just 5 training documents per author—about 8 times higher than with random guessing. Table 3 and results in the Appendix show that these findings are relatively stable across different datasets. We also see strong evidence that random forest should be preferred for authorship attribution, particularly at low sample sizes. It achieves the highest (or close to it) accuracy rates consistently across datasets and at different sample sizes.

Shapley-Driven Protection of Authorship

—Explaining Attribution with Shapley Values

A very high level of confidence in the model's prediction is necessary for the intruder to actually act on the attribution. One way to achieve this is to bolster the judgement of the data intruder, so he/she can utilize their subject matter knowledge. For example, a data intruder may decide to act on the attribution after inspecting the top features present in the test document that indicate authorship. The intruder could decide to "act" only when the model's reasoning is human intelligible or defensible in context.

The inventors note that variable importance plots, a standard diagnostic practice with random forests, are useful in this regard but not ideal. Variable importance do not typically vary by author or document. Yet, ultimately the system may have a measure of the contribution of each variable to the attribution of each test document. Thus, a new measure or technique is warranted. One solution to this problem is to utilize Shapley values—a concept for game theory that has been recently applied to bring interpretability to black box machine learning models. The goal of Shapley values is to determine how to fairly distribute rewards among different players.

In the context herein, assume that each covariate is a player in the game, and that the predicted probability of authorship is the reward. Specifically, for document i, variable j, and author k, the Shapley value is defined as $$\phi_{jk}(\hat{p}_k, x_i) = \sum_{S \subset \{x_{i1}, \ldots, x_{im}\} \setminus \{x_{ij}\}} \frac{|S|!(m - |S| - 1)!}{m!} (\hat{p}_k(S \cup \{x_{ij}\}) - \hat{p}_k(S)),$$ EQ. 2 where S is a subset of features used in the model, m the number of features, P k (S) is the predicted probability for author k using feature values in S. Note that the Shapley value is distinct from the difference in prediction if we were to drop a variable from the model. Instead, the Shapley value is the contribution of the observed variable in the test document to the difference between the actual and mean prediction. Exact computation of Equation (2) is intractable given the number of all possible variable combinations increases exponentially with the number of features. As such, several approximation techniques have been developed to speed up computation with theoretical guarantees.

The system may use a Monte-Carlo sampling approximation method.

To illustrate how the Shapley value can yield interpretable predictions, consider the Twitter dataset and assume 4 potential authors (Senators Ted Cruz, Dean Heller, Rand Paul, and Bill Nelson), 100 training documents each, and a sophisticated data intruder. Suppose the system considers the following test document:

"We should defend the First Amendment, but Dems want to repeal it & regulate political speech. #DontRepealA: http://t.co/zLWre8xN9f"

The random forest model predicts Ted Cruz as the author (a correct prediction), since he has the highest predicted probability at 29% among the potential authors. FIG. 7 shows the top (bottom) 10 variables according to Shapley values, that is, the 10 features that add (subtract) most to the probability of authorship. We see that Ted Cruz is the predicted author because of the words "speech" and "DontRepealA". Further, the lack of "@" signs and a single hashtag (#) contribute to Senator Cruz as the author. Features that subtract his probability of authorship are mostly stylometric, including the frequency of certain characters.

If the computational demands are too great for Shapley values, the method can use the ingestion steps above with a frequency-based analysis to explain the writing style of each other separately and compare it to the test document.

A Protection Strategy

Recognizing the importance of bag of words to the sophisticated intruder from our results above, we note that protecting the content of text is a challenging task due to the unstructured form of text. For example, an author may self-identify themselves or limit themselves to a small group of candidates by revealing important details. Traditionally, this sensitive textual content is protected by redaction, as is done with sensitive government documents or legal documents (e.g., removing the location of a classified region of interest or the name of a child victim). Certain prior art summarized various ways to algorithmically (i.e., automatically) rewrite text to obfuscate authorship and found that the most successful approaches modified the text by substitution or deletions of content. However, they stated that most of the algorithms resulted in text that lost the original intent and meaning. It remains an open problem of how to rewrite text systematically while preserving the data utility of the textual content simultaneously. As such, we propose a simple protection strategy that uses the Shapley values to inform how documents should be rewritten to protect the original author from attribution. Specifically, one can inspect the Shapley values to move the predicted probability close to uniform or adversarially make the document seem as if it was authored by someone else.

For example, returning to the illustrative Twitter example, modifying the test document above to the following will shift the probability of authorship away from Ted Cruz and towards Dean Heller.

"We should defend the First Amendment, but @Dems want to repeal it and regulate political speech. #DontRepealJA: http://t.co/zLWre8xN9f"

As shown in FIG. 8, having no "@" signs contributes positively for attribution to Senator Ted Cruz and negatively for Senator Dean Heller. The use of "and" as opposed to "&" has the same effect.

Hardware Introduction

The system and method described may be implemented using system and hardware elements shown and described herein. For example, FIG. 9.1 shows an embodiment of a network 100 with one or more clients 102*a*, 102*b*, 102*c* that may be local machines, personal computers, mobile devices, servers, or tablets that communicate through one or more networks 110 with servers 104*a*, 104*b*, 104*c*. It should be appreciated that a client 102*a*-102*c* may serve as a client seeking access to resources provided by a server and/or as a server providing access to other clients.

The network 110 may be wired or wireless. If it is wired, the network may include coaxial cable, twisted pair lines, USB cabling, or optical lines. The wireless network may operate using BLUETOOTH, Wi-Fi, Worldwide Interoperability for Microwave Access (WiMAX), infrared, or satellite networks. The wireless links may also include any cellular network standards used to communicate among mobile devices including the many standards prepared by the International Telecommunication Union such as 3G, 4G, and LTE. Cellular network standards may include GSM, GPRS, LTE, WiMAX, and WiMAX-Advanced. Cellular network standards may use various channel communications such as FDMA, TDMA, CDMA, or SDMA. The various networks may be used individually or in an interconnected way and are thus depicted as shown in FIG. 9.1 as a cloud.

The network 110 may be located across many geographies and may have a topology organized as point-to-point, bus, star, ring, mesh, or tree. The network 110 may be an overlay network which is virtual and sits on top of one or more layers of other networks.

In most cases, every device on a network has a unique identifier. In the TCP/IP protocol, the unique identifier for a computer is an IP address. An IPv4 address uses 32 binary bits to create a single unique address on the network. An IPv4 address is expressed by four numbers separated by dots. Each number is the decimal (base-10) representation for an eight-digit binary (base-2) number, also called an octet. An IPv6 address uses 128 binary bits to create a single unique address on the network. An IPv6 address is expressed by eight groups of hexadecimal (base-16) numbers separated by colons.

An IP address can be either dynamic or static. A static address remains constant for a system unless modified by a user. Dynamic addresses are assigned by the Dynamic Host Configuration Protocol (DHCP), a service running on the network. DHCP typically runs on network hardware such as routers or dedicated DHCP servers.

Dynamic IP addresses are issued using a leasing system, meaning that the IP address is only active for a limited time. If the lease expires, the computer will automatically request a new lease. Sometimes, this means the computer will get a new IP address, too, especially if the computer was unplugged from the network between leases. This process is usually transparent to the user unless the computer warns about an IP address conflict on the network (two computers with the same IP address).

Another identifier for a device is the hostname. A hostname is a human-readable label assigned to a device and can be modified by a user. Hostname can be resolved to the IP address of the device. This makes hostname a more reliable device identifier in a network with dynamic IP addresses.

Information in the IP Address may be used to identify devices, geographies, and networks. The hostname may be used to identify devices.

A system may include multiple servers 104a-c stored in high-density rack systems. If the servers are part of a common network, they do not need to be physically near one another but instead may be connected by a wide-area network (WAN) connection or similar connection.

Management of group of networked servers may be de-centralized. For example, one or more servers 104a-c may include modules to support one or more management services for networked servers including management of dynamic data, such as techniques for handling failover, data replication, and increasing the networked server's performance.

The servers 104a-c may be file servers, application servers, web servers, proxy servers, network appliances, gateways, gateway servers, virtualization servers, deployment servers, SSL VPN servers, or firewalls.

When the network 110 is in a cloud environment, the cloud network 110 may be public, private, or hybrid. Public clouds may include public servers maintained by third parties. Public clouds may be connected to servers over a public network. Private clouds may include private servers that are physically maintained by clients. Private clouds may be connected to servers over a private network. Hybrid clouds may, as the name indicates, include both public and private networks.

The cloud network may include delivery using IaaS (Infrastructure-as-a-Service), PaaS (Platform-as-a-Service), SaaS (Software-as-a-Service) or Storage, Database, Information, Process, Application, Integration, Security, Management, Testing-as-a-service. IaaS may provide access to features, computers (virtual or on dedicated hardware), and data storage space. PaaS may include storage, networking, servers or virtualization, as well as additional resources such as, e.g., the operating system, middleware, or runtime resources. SaaS may be run and managed by the service provider and SaaS usually refers to end-user applications. A common example of a SaaS application is SALESFORCE or web-based email.

A client 102a-c may access IaaS, PaaS, or SaaS resources using preset standards and the clients 102a-c may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

The clients 102a-c and servers 104a-c may be embodied in a computer, network device or appliance capable of communicating with a network and performing the actions herein. FIGS. 9.1 and 9.2 show block diagrams of a computing device 120 that may embody the client or server discussed herein. The device 120 may include a system bus 150 that connects the major components of a computer system, combining the functions of a data bus to carry information, an address bus to determine where it should be sent, and a control bus to determine its operation. The device includes a central processing unit 122, a main memory 124, and storage device 126. The device 120 may further include a network interface 130, an installation device 132 and an I/O control 140 connected to one or more display devices 142, I/O devices 144, or other devices 146 like mice and keyboards.

The storage device 126 may include an operating system, software, and a network user behavior module 128, in which may reside the network user behavior system and method described in more detail below.

The computing device 120 may include a memory port, a bridge, one or more input/output devices, and a cache memory in communication with the central processing unit.

The central processing unit 122 may be a logic circuitry such as a microprocessor that responds to and processes instructions fetched from the main memory 124. The CPU 122 may use instruction level parallelism, thread level parallelism, different levels of cache, and multi-core processors. A multi-core processor may include two or more processing units on a single computing component.

The main memory 124 may include one or more memory chips capable of storing data and allowing any storage location to be directly accessed by the CPU 122. The main memory unit 124 may be volatile and faster than storage memory 126. Main memory units 124 may be dynamic random-access memory (DRAM) or any variants, including static random-access memory (SRAM). The main memory 124 or the storage 126 may be non-volatile.

The CPU 122 may communicate directly with a cache memory via a secondary bus, sometimes referred to as a backside bus. In other embodiments, the CPU 122 may communicate with cache memory using the system bus 150. Cache memory typically has a faster response time than main memory 124 and is typically provided by SRAM or similar RAM memory.

Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, 3D printers, and VR headsets.

Additional I/O devices may have both input and output capabilities, including haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures.

In some embodiments, display devices 142 may be connected to the I/O controller 140. Display devices may include liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, VR or 3D displays.

The computing device 120 may include a network interface 130 to interface to the network 110 through a variety of connections including standard telephone lines LAN or WAN links (802.11, T1, T3, Gigabit Ethernet), broadband connections (ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols. The computing device 120 may communicate with other computing devices via any type and/or form of gateway or tunneling protocol such as Secure Socket Layer (SSL) or Transport Layer Security (TLS). The network interface 130 may include a built-in network adapter, network interface card, PCMCIA network card, EXPRESSCARD network card, card bus network adapter, wireless network adapter, USB network adapter, modem or any other device suitable for interfacing the computing device 120 to any type of network capable of communication and performing the operations described herein.

The computing device 120 may operate under the control of an operating system that controls scheduling of tasks and access to system resources. The computing device 120 may be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein.

The computer system 120 can be any workstation, telephone, desktop computer, laptop or notebook computer, netbook, tablet, server, handheld computer, mobile telephone, smartphone or other portable telecommunications device, media playing device, a gaming system, mobile computing device, or any other type and/or form of computing, telecommunications or media device that is capable of communication.

The status of one or more machines 102a-c, 104a-c may be monitored, generally, as part of network management. In one of these embodiments, the status of a machine may include an identification of load information (the number of processes on the machine, CPU and memory utilization), of port information (the number of available communication ports and the port addresses), session status (the duration and type of processes, and whether a process is active or idle), or as mentioned below. In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

While the invention has been described with reference to the embodiments herein, a person of ordinary skill in the art would understand that various changes or modifications may be made thereto without departing from the scope of the claims.

The invention claimed is:

1. A method for identifying the author of a written work, comprising:

calculating a Shapley value using the formula $$\phi_{jk}(\hat{p}_k, x_i) = \sum_{S \subset \{x_{i1}, \ldots, x_{im}\} \setminus \{x_{ij}\}} \frac{|S|!(m - |S| - 1)!}{m!} (\hat{p}_k(S \cup \{x_{ij}\}) - \hat{p}_k(S)),$$

where for document i, variable j, and author k, where S is a subset of features used in the model, m the number of features, $\hat{p}_k(S)$ is the predicted probability for author k using feature values in S;

approximating a % value of a true author by solving for Equation (1) using a Monte-Carlo sampling approximation method.

2. The method of claim 1, wherein the subset of features includes bag of words.

3. The method of claim 1, wherein the subset of features includes punctuation.

4. The method of claim 1, wherein the subset of features includes stylometry.

5. The method of claim 1, wherein the subset of features includes stop words.

6. The method of claim 1, wherein the subset of features includes two or more features chosen from a list consisting of: bag of words, punctuation, stop words, stylometry, and n-grams.

7. A method for identifying the author of a written work, comprising:
   - a first stage that uses a structured data inquiry to identify potential authors of a work;
   - a second stage that uses text analysis to rank order the potential authors that predicts the author $Y_t$ for a document t using an algorithm: $Y_t \in N^*_t$ where $x_t$ denotes a vector of features extracted from the work.

* * * * *